(12) United States Patent
Xi et al.

(10) Patent No.: US 10,817,764 B2
(45) Date of Patent: Oct. 27, 2020

(54) ROBOT SYSTEM FOR PROCESSING AN OBJECT AND METHOD OF PACKAGING AND PROCESSING THE SAME

(71) Applicants: Beijing Jingdong Shangke Information Technology Co., Ltd., Beijing (CN); JD.com American Technologies Corporation, Mountain View, CA (US)

(72) Inventors: Wei Xi, Mountain View, CA (US); Hui Cheng, Mountain View, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 146 days.

(21) Appl. No.: 16/137,673

(22) Filed: Sep. 21, 2018

(65) Prior Publication Data
US 2020/0094414 A1    Mar. 26, 2020

(51) Int. Cl.
| | |
|---|---|
| *G06K 19/06* | (2006.01) |
| *G01B 11/26* | (2006.01) |
| *B25J 11/00* | (2006.01) |
| *G06T 7/70* | (2017.01) |
| *B25J 9/16* | (2006.01) |
| *G06K 9/00* | (2006.01) |
| *G06K 9/20* | (2006.01) |

(Continued)

(52) U.S. Cl.
CPC ........... *G06K 19/06* (2013.01); *B25J 9/1697* (2013.01); *B25J 11/005* (2013.01); *G01B 11/26* (2013.01); *G06K 9/00664* (2013.01); *G06K 9/2018* (2013.01); *G06K 9/2054* (2013.01); *G06K 9/3233* (2013.01); *G06K 19/06037* (2013.01); *G06T 7/11* (2017.01); *G06T 7/70* (2017.01); *G06K 2009/00644* (2013.01)

(58) Field of Classification Search
CPC ...................................................... G06K 19/06
See application file for complete search history.

(56) References Cited

U.S. PATENT DOCUMENTS

6,732,928 B1 *  5/2004  Lawlor .................. G06K 1/121
                                                    235/432
9,826,213 B1 * 11/2017  Russell .................. B65G 69/00
(Continued)

*Primary Examiner* — Thomas Randazzo
(74) *Attorney, Agent, or Firm* — China Science Patent & Trademark US LLC; Shanyun Lu (57) ABSTRACT

A robot system for processing an object to be packaged as a product, a packaging method, and a method of processing the same are provided. The object has multiple surfaces, and multiple e-package information tags are provided on the surfaces of the object for storing information of the product. Each surface is provided with one of the e-package information tags. The information of the product includes information of a location, an orientation and physical features of the object. In operation, the robot system controls a sensing device to detect and capture one of the e-package information tags on the object to obtain a captured image, and processes the captured image to obtain the information of the product. Based on the information of the product, the robot system controls a robotic grasping device to perform a robotic manipulation for handling the object.

20 Claims, 10 Drawing Sheets

(51) Int. Cl.
    *G06T 7/11*           (2017.01)
    *G06K 9/32*          (2006.01)

(56) References Cited

U.S. PATENT DOCUMENTS

| | | | |
|---|---|---|---|
| 10,616,553 B1* | 4/2020 | Russell | B65D 19/38 |
| 2009/0242649 A1* | 10/2009 | Mizukoshi | G06K 19/06037 |
| | | | 235/494 |
| 2014/0042233 A1* | 2/2014 | Yang | G06K 19/06046 |
| | | | 235/494 |
| 2014/0334723 A1* | 11/2014 | Chatow | G06K 19/0614 |
| | | | 382/165 |
| 2015/0134497 A1* | 5/2015 | Carney | G06T 19/00 |
| | | | 705/28 |
| 2016/0167227 A1* | 6/2016 | Wellman | B25J 9/1612 |
| | | | 700/259 |
| 2016/0252753 A1* | 9/2016 | Deng | G03F 9/7088 |
| | | | 29/281.5 |
| 2016/0275326 A1* | 9/2016 | Falkenstern | G06T 1/0021 |
| 2017/0032309 A1* | 2/2017 | Gillen | G06Q 10/1093 |
| 2018/0025185 A1* | 1/2018 | Hattrup | G06Q 10/0833 |
| | | | 235/375 |
| 2018/0111271 A1* | 4/2018 | Hwang | G06T 7/60 |
| 2018/0165518 A1* | 6/2018 | Assaf | G06K 9/00671 |
| 2018/0312288 A1* | 11/2018 | Hopner | B65C 9/067 |
| 2018/0373950 A1* | 12/2018 | Gong | G06K 9/3233 |
| 2019/0014310 A1* | 1/2019 | Bradski | H04N 13/246 |
| 2019/0090955 A1* | 3/2019 | Singh | A61B 17/00 |
| 2019/0171919 A1* | 6/2019 | Staton | G06K 19/06037 |
| 2019/0180291 A1* | 6/2019 | Schmeling | G06Q 30/0185 |
| 2019/0339071 A1* | 11/2019 | Tanaka | G01B 11/26 |
| 2020/0024853 A1* | 1/2020 | Furrer | E04F 21/0076 |
| 2020/0082200 A1* | 3/2020 | Huang | G06K 9/4638 |

* cited by examiner

ROBOT SYSTEM FOR PROCESSING AN OBJECT AND METHOD OF PACKAGING AND PROCESSING THE SAME

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE INVENTION

The invention relates generally to robot technology, and more particularly to a robot system for processing an object/product including its package, a packaging method, and a method of processing the same.

BACKGROUND OF THE INVENTION

The background description provided herein is for the purpose of generally presenting the context of the invention. Work of the presently named inventors, to the extent it is described in this background section, as well as aspects of the description that may not otherwise qualify as prior art at the time of filing, are neither expressly nor impliedly admitted as prior art against the present invention.

Existing product packaging is mainly aimed at traditional brick-mortar stores, where consumers browse and examine products that he or she buys in person. In this scenario, the product packaging needs to be attractive to consumers. Machine readable information such as a barcode is printed on the back together with other detailed information about the product often required by laws and regulations. In order to read the barcode by a computer, especially when the pose of a product can be arbitrary, sophisticated equipment is developed which is expensive and often not reliable.

Therefore, there is a need to address the aforementioned deficiencies and inadequacies in the art.

SUMMARY OF THE INVENTION

One aspect of the invention relates to a packaging method, which includes: providing an object as a product to be packaged; and providing a plurality of e-package information tags on a plurality of surfaces of the object for storing information of the product including information needed for manipulation and transportation the product, wherein each of the surfaces is provided with at least one of the e-package information tags thereon, and the information of the product comprises information of, but not limited to, a location, an orientation, physical features of the object, handling instruction, transportation instruction, etc.

Another aspect of the invention relates to a robot system for processing an object as a product. The robot system includes a plurality of robotic grasping devices, a plurality of sensing devices, and a controller. Each of the robotic grasping devices is configured to grasp one or more types of objects and multiple grasping devices are jointly configured to grasp additional types objects. A plurality of e-package information tags is provided on a plurality of surfaces of the object for storing information of the product. Each of the surfaces is provided with one of the e-package information tags thereon. The information of the product includes information of a location, an orientation and physical features of the object. Each of the sensing devices is configured to obtain the information of the product. The controller is configured to perform: controlling one or multiple of the sensing devices to detect and capture one of the e-package information tags on the object into processing system such as an image; processing the image to obtain the information of the product; and based on the information of the product, controlling one of the robotic grasping devices to perform a robotic manipulation for handling the object.

A further aspect of the invention relates to a method of processing an object using a robot system, which includes: providing the object as a product, wherein a plurality of e-package information tags are provided on a plurality of surfaces of the object for storing information of the product, each of the surfaces is provided with one of the e-package information tags thereon, and the information of the product includes information of a location, an orientation and physical features of the object; controlling a sensing device of the robot system to detect and capture one of the e-package information tags on the object to obtain a captured image; processing the captured image to obtain the information of the product; and based on the information of the product, controlling a robotic grasping device of the robot system to perform a robotic manipulation for handling the object.

In certain embodiments, each of the sensing devices is a camera, and each of the robotic grasping devices is a suction device, a robot arm, a gripper, or an electrical adhesive device.

In certain embodiments, the one of the e-package information tags provided on each of the surfaces is provided at a different relative location thereon, with a different size, or with a different shape.

In certain embodiments, each of the e-package information tags is in a form of a 2-dimensional code having a first area and a second area. In one embodiment, the first area is a middle area, and the second area is an outer area.

In certain embodiments, the first area of each of the e-package information tags is designed for easy detection and robust pose estimation, and the second area of each of the e-package information tags stores the information of the physical features of the object, where the physical features of the object includes: a dimension of the object; a weight of the object; a weight distribution of the object; a property of the object; product information of the object; and the location and the orientation of the object.

In certain embodiments, each of the e-package information tags is in a form of a tag, a 1-dimensional barcode, or a watermark tag.

In certain embodiments, each of the e-package information tags stores information or specification of robotic manipulation for handling the object.

In certain aspects, the present invention relates to a packaging method. The method includes the steps of:
providing an object as a product to be packaged; and
providing an e-package information tag on each corner of at least one surface of the object for storing information of the product, wherein the information of the product comprises information of a location, an orientation and physical features of the object.

In certain embodiments, the e-package information tag is located at each corner of all the surfaces of the object or package. In other embodiments, the e-package information tag is located at each corner of one or more surfaces of the object that are configured to be manipulated by a robot.

In certain embodiments, the e-package information tag comprises Apriltags or QR codes, and the e-package information tag comprises dimension, order ID, weight, weight distribution, and product information of the object. In certain embodiments, the e-package information tag comprises maximal speed, maximal force can be applied, fragility, property, humidity, and temperature of the object.

In certain embodiments, each surface of the object that is operable by a robot is further provided with a surface point for determination of the surface as an operable surface and determination of a geometric center of the object.

In certain aspect, the present invention relates to a robot system for processing the object, such as the object as described above. The system includes: a plurality of robotic grasping devices, each being configured to grasp the object; a plurality of sensing devices, each being configured to obtain the information of the product; and a controller configured to control the robotic grasping devices and the sensing devices.

In certain embodiments, the controller is configured to perform: controlling one of the sensing devices to detect and capture one of the e-package information tags on the object to obtain a captured image and to detect location of the e-package information tags; processing the captured image to obtain the information of the product; and based on the information of the product and the location of the e-package information tags, controlling one of the robotic grasping devices to perform a robotic manipulation for handling the object.

In certain embodiments, each of the sensing devices is a camera, and each of the robotic grasping devices is a suction device, a robot arm, a gripper, or an electrical adhesive device.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

The description will be made as to the embodiments of the present invention in conjunction with the accompanying drawings. In accordance with the purposes of this invention, as embodied and broadly described herein, this invention, in certain aspects, relates to a robot system for processing an object to be packaged as a product, a packaging method, and a method of processing the same.

Currently, with the booming of internet shopping, more and more people browse and purchase their products online which makes the appearance of the physical package of a product less important for the purchasing decision. On the other hand, internet shopping requires efficient and low-cost logistic networks that more and more rely on robots to manipulate and to transport goods. Therefore, in certain embodiments of the present invention, the inventor discloses a new product packaging method (also referred to as "e-Package"), that is designed for the needs of internet shopping and unmanned or assisted logistics operations.

Figure 1:
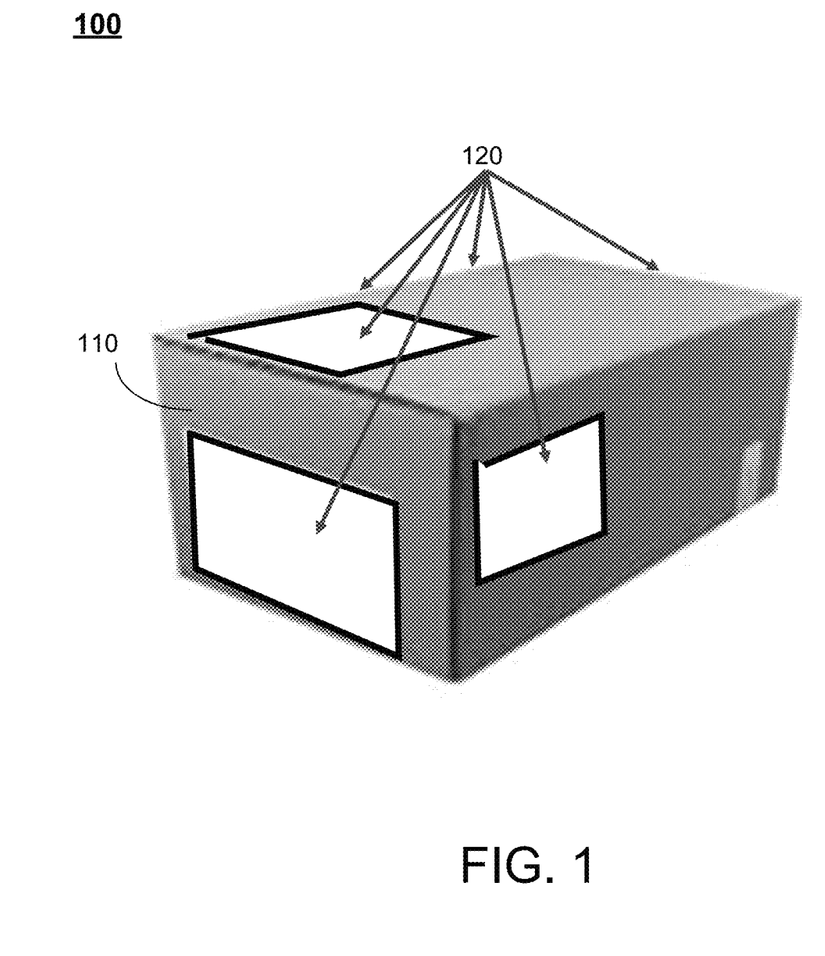
FIG. 1 is a schematic view of an object being packaged as a product using the packaging method according to certain embodiments of the present invention.

FIG. 1 is a schematic view of an object being packaged as a product using the packaging method according to certain embodiments of the present invention. As shown in FIG. 1, an object 100 is provided to be packaged as a product to be processed and delivered. The object 100 is in a shape of a cuboid box, which has six surfaces 110. Each surface 110 has an e-package information tag 120 provided thereon for storing the information of the product. In other words, for the six surfaces 110 of the object 100, there are six e-package information tags 120. The shape, size and location of these tags can vary. For example, each of the e-package information tags 120 may independently in a shape of a rectangular, a square, an oval, in a size the same or different from other e-package information tags, or in a location of one of the four corners, the center, or any predesigned locations of the corresponding surface 110. In this case, regardless of the pose (i.e., the location and/or orientation) of the object is, at least some of the six e-package information tags 120 will be visible and sensible or scannable, as long as the object 100 is not fully or mostly occluded. Therefore, a robot system having only one sensing, scanning, imaging or other information collection device can be installed from one direction and obtain the information of the product from the object 100 with one of the e-package information tags 120.

The information of the product stored in each of the e-package information tags 120 may include, without being limited thereto, information of a location, an orientation and physical features of the object 100, as well as information of detailed robotic manipulation specification for handling the object 100, such as where to apply a suction cup relative to the center of the tag in order to pick the object up. Details of the information being stored in the e-package information tags 120 may be described hereinafter.

In certain embodiments, for each of the six surfaces 110 of the object 100, the e-package information tag 120 provided on each surface 110 may be provided at a different relative location thereon. In this case, the different relative locations of the e-package information tags 120 may be used to identify the location and the orientation of the object 100. For example, on the top surface as shown in FIG. 1, the e-package information tag 120 is located at an upper left corner. On the two side surfaces facing the front as shown in FIG. 1, the e-package information tag 120 on the side surface at the left is located at a bottom side, and the e-package information tag 120 on the side surface facing the right is located at a left side. The other three e-package information tags 120 on the back side surfaces and the bottom surfaces may also be located at different relative locations. Thus, each of the six surfaces 110 may be identified by an index encoded in the tag, or the different relative locations of the e-package information tags 120, such that the location and orientation of the object 100 may be determined based on the arrangement of the surfaces 110. In certain embodiments, the relative location of each e-package information tags 120 in the corresponding side surface can be used to aid the detection of the edges of that corresponding side surface. For example, the tags 120 may contain location information of the product boundaries, and by detecting and decoding the information in the tags 120, the system knows where the product boundaries should be instead of requiring the detection of the edges. In certain embodiments, each e-package information tags 120 includes identification of the corresponding side surface, and the side surface thus can be detected by simply reading the information tags 120.

Figure 2A:
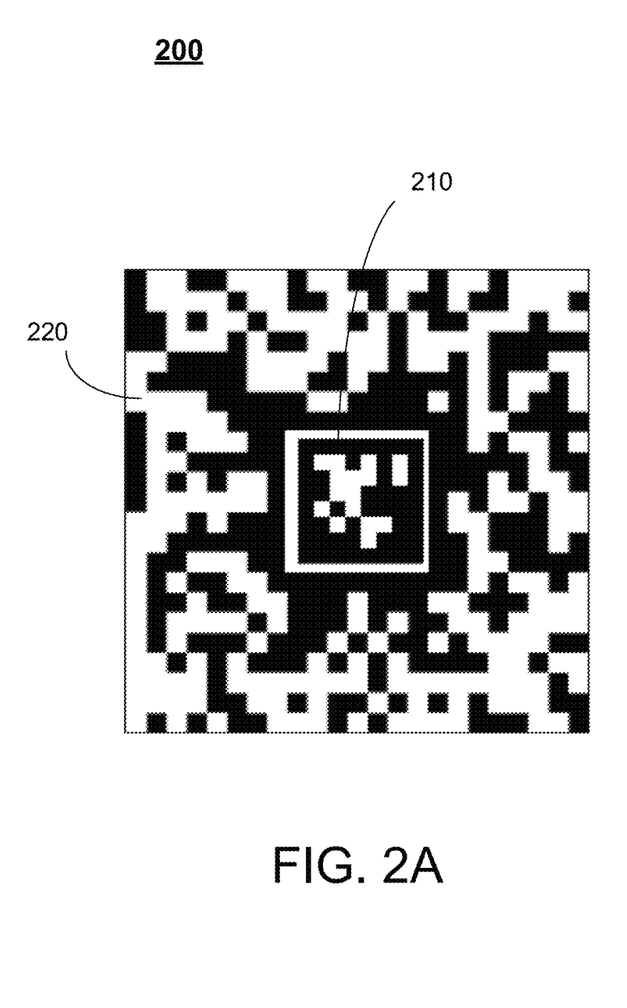
FIG. 2A is a schematic view of an e-package information tag according to certain embodiments of the present invention, where the e-package information tag is a 2-dimensional code.

FIG. 2A is a schematic view of an e-package information tag according to certain embodiments of the present invention. As shown in FIG. 2A, the e-package information tag 200 is in a form of a 2-dimensional code. Specifically, the e-package information tag 200 includes two areas, namely a first area 210 and a second area 220, which may be used to store different information. In certain embodiments, the first area 210 stores information for identifying the e-package information tag 200. For example, the first area 210 may have simple patterns such that the first area 210 can be easily detected and captured, and the pose of the first area 210 or the whole e-packaging information tag 200 can also be fast and reliably estimated. The estimation of the pose may include determining the rotations, the distance, the skew of the first area 210, and in certain embodiments, the pose of the first area can be further used for the estimating the pose of the whole e-packaging information tag 200 or the product. In certain embodiments, the second area 220 has more complex pattern, and includes information of the product containing the object. As show in FIG. 2A, the first area is a middle area 210 and the second area is an outer area 220. For example, the middle area 210 of the e-package information tag 200 may be specifically designed patterns that are easy for computer to detect and to estimate the pose of the tag; and the outer area 220 of the e-package information tag 200 may be used to store the information of the physical features of the object 100 and information of the location and the orientation of the object 100, which may be used for the robotic manipulation for handling the object 100. Examples of the physical features of the object 100 may include, without being limited thereto, a dimension of the object 100; a weight of the object 100; a weight distribution of the object 100; a property of the object 100; and product information of the object 100.

Figure 2B:
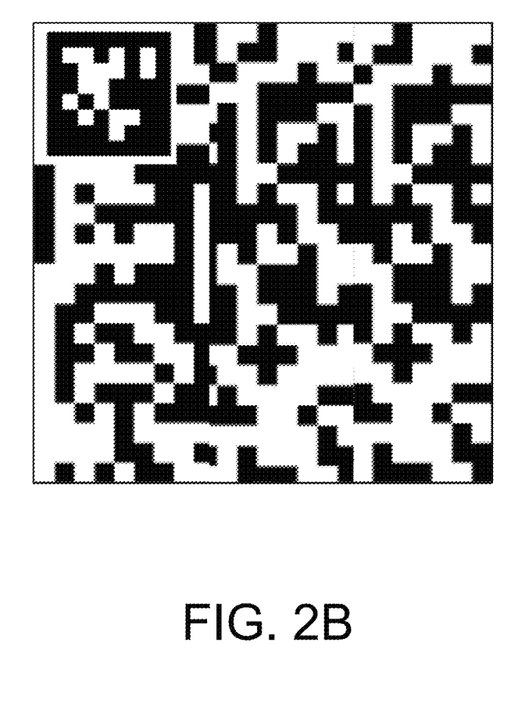
FIG. 2B is a schematic view of another e-package information tag according to certain embodiments of the present invention.

It should be noted that the first area can be in the center, one of the four corners, or any other predetermined or known area of the e-package information tag 200. FIG. 2B is a schematic view of another e-package information tag according to certain embodiments of the present invention, where the first area 210 is located in the upper left corner of the e-package information tag.

Figure 2C:
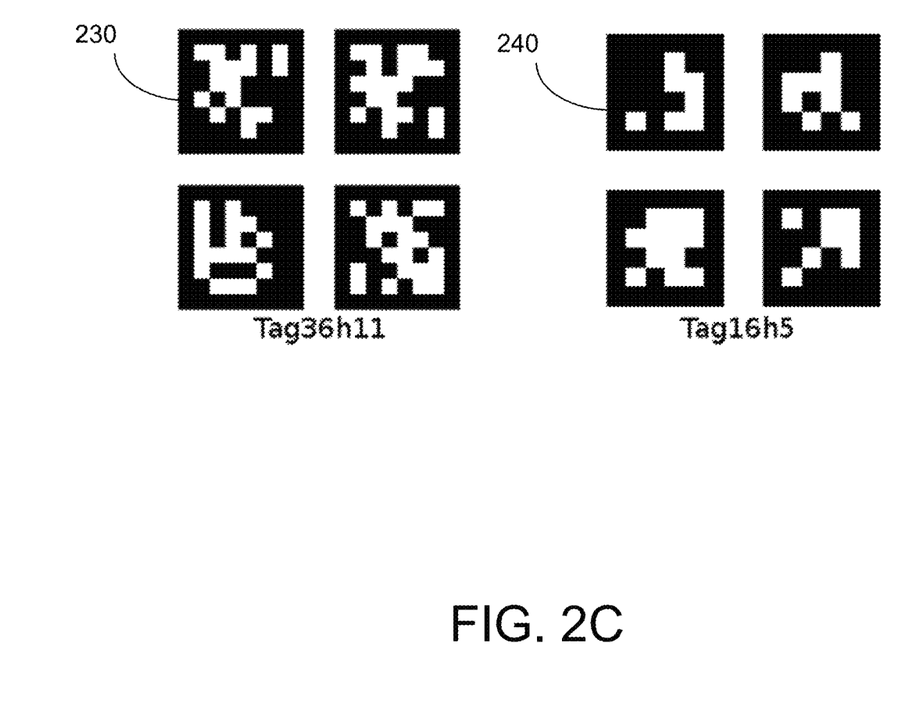
FIG. 2C is a schematic view of examples of e-package information tags in different forms according to certain embodiments of the present invention.

It should be noted that the format of the e-package information tag 200 is not limited to the 2-dimensional code as shown in FIG. 2A and FIG. 2B. For example, FIG. 2C is a schematic view of examples of e-package information tags in different forms according to certain embodiments of the present invention. As shown in FIG. 2C, each of the e-package information tags may include multiple 2-dimensional codes 230 and 240 to form a tag. Other forms of the e-package information tags that may be used include, without being limited thereto, a 1-dimensional barcode or a watermark tag, or any other computer readable or scannable information storing formats that may carry information needed by the logistic operations of the object 100.

Figure 3A:
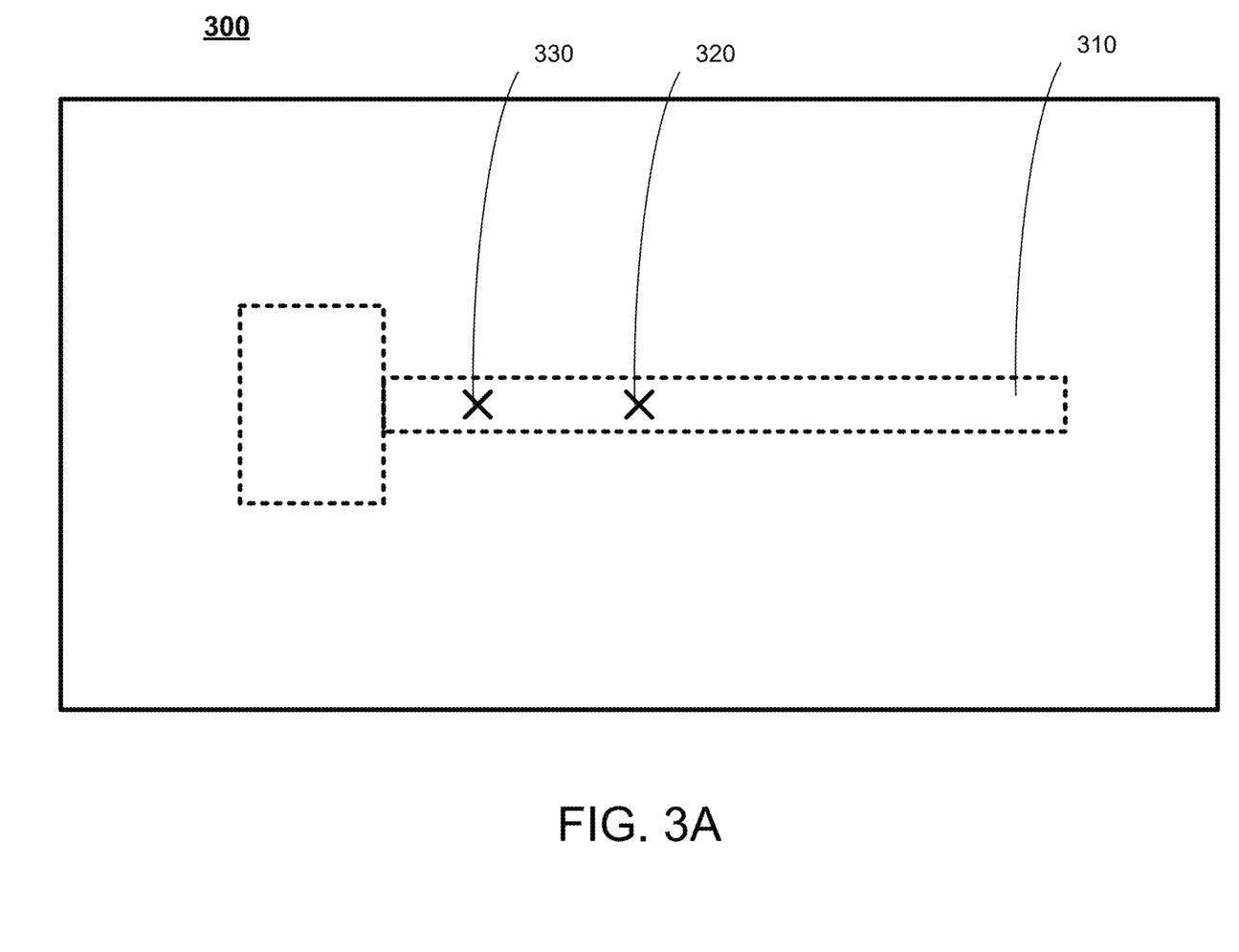
FIG. 3A is a schematic view showing a weight distribution of an object according to certain embodiments of the present invention.

In certain embodiments, the weight distribution of the object 100 may be described as a relative location of the center of mass (or center of weight). FIG. 3A is a schematic view showing a weight distribution of an object according to certain embodiments of the present invention. Specifically, FIG. 3A shows a top view of the object 300, in which a hammer 310 (shown in the dotted line) is packaged as the product in the box. Since the head of the hammer 310, which is significantly heavier than the handle of the hammer 310, is on the left side of the box, the center of mass 330 of the object 300 is located at a relative left side of the center of the surface 320. In this case, the e-package information tag 200 provided on the surface may be provided with the information of the location of the center of mass 330 of the object 300 as the information of the weight distribution. It should be noted that the relative locations of the center of mass 330 from different views of the object 300 (i.e., different surfaces) may be different. In other words, the information stored in the e-package information tags 200 provided on different surfaces of the object may be provided with different information to reflect the different information of the weight distribution in different orientations.

Figure 3B:
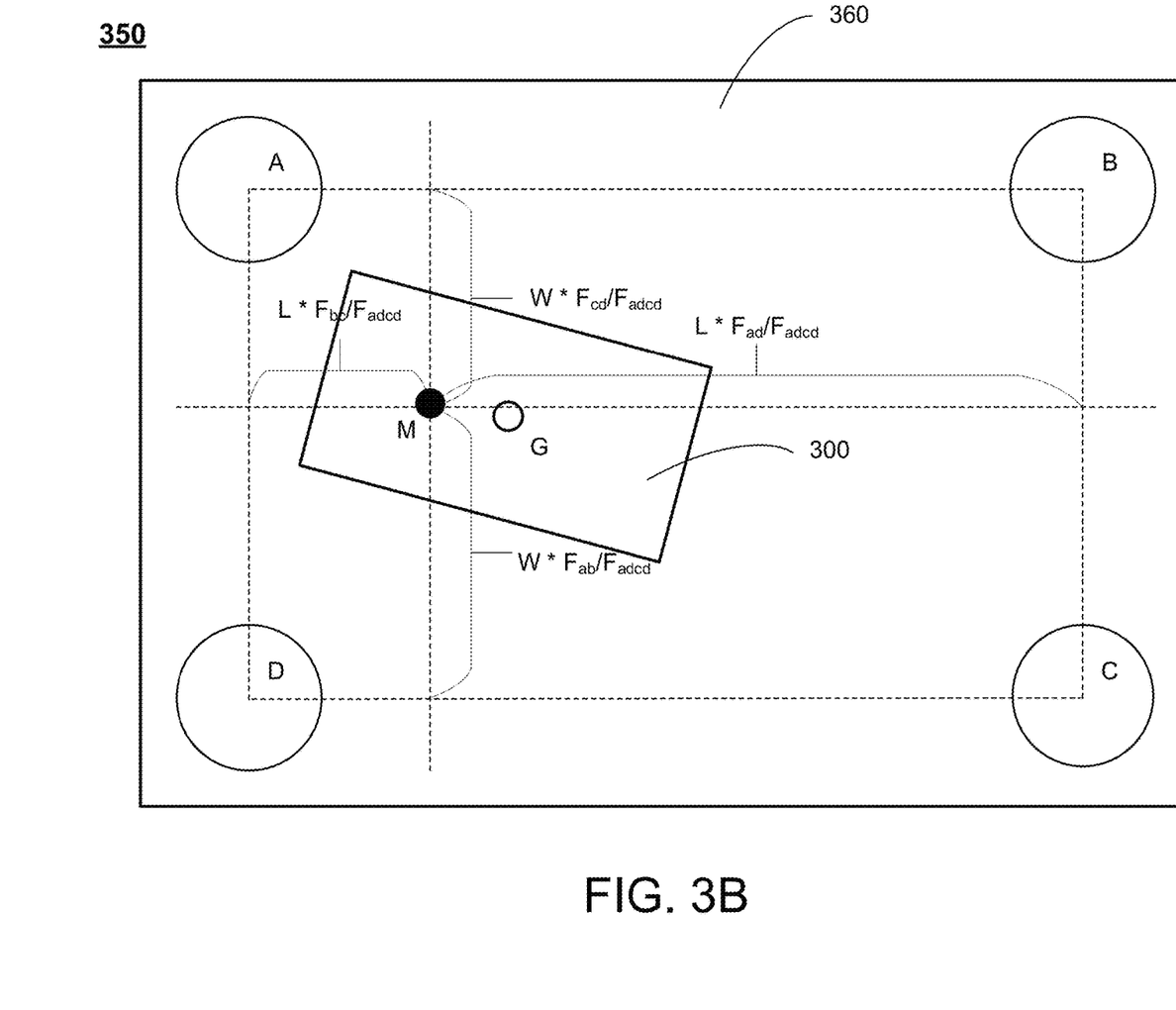
FIG. 3B is a schematic view of measuring weight distribution of a product according to certain embodiments of the present invention.

FIG. 3B is a schematic view of measuring weight distribution of a product according to certain embodiments of the present invention. As shown in FIG. 3B, scales 350 includes four scales A, B, C and D. The four scales A, B, C and D are covered by a rigid top plate 360. For measuring weight distribution, the object 300 is moved onto the top plate 360. The weights measure by the four scales A, B, C and D are respectively Fa, Fb, Fc and Fd. The total weights of the four scales are the sum of Fa, Fb, Fc and Fd, and named Fabcd. The sum of Fa and Fb is named Fab, the sum of Fb and Fc is named Fbc, the sum of Fc and Fd is named Fcd, and the sum of Fd and Fa is named Fad. The length of the scales is defined L (between the line connecting the scales A and D and the line connecting scales B and C), and the width of the scale is defined W (between the line connecting the scales A and B and the line connecting the scales C and D). The length of L may be the same, less than, or greater than W, depending on the space required by the scales and the sizes of the object 300 to be weighted. The center of mass of the object 300, projected on the top plate 360, along the length direction, is calculated to be in a distance of L×Fbc/Fadcd to the line connecting A and D, or to be in a distance of L×Fad/Fadcd to the line connecting B and C. The center of mass of the object 300, projected on the top plate 360, along the width direction, is calculated to be in a distance of W×Fcd/Fadcd to the line connecting A and B, or to be in a distance of W×Fab/Fadcd to the line connecting C and D. Accordingly, the center of mass of the object 300 projected on the top plate 360 (shown by a solid circle M) is calculated. In comparison, the geometrical center of the object 300 is calculated through the 3D geometrical structure of the object 300. The geometrical center projected on the top plate 360 is shown as empty circle G. In certain embodiments, the arrangement of the object 300 standing on the current bottom surface is a main position for manipulation, and the center of mass of the object 300 in 3D is estimated by extending the point M upward half of the height H of the object 300. In certain embodiments, the object 300 may also be flipped three times to measure three projections of the center of mass, and estimate the center of mass more accurately using the three projections of the center of mass.

As discussed above, the information of the location and the orientation of the object 100, as well as the information of the physical features of the object 100, may be used to perform the robotic manipulation for handling the object. For example, a specific object 100 may have one surface being labeled as a "top surface," which is preferably facing upward. However, the actual pose of the object 100 may not be ideal, and the "top surface" may not be facing upward. In this case, a robot system may obtain the information of the location, orientation and the physical features of the object 100, and perform the robotic manipulation for handling the object by flipping the object 100, such that the object is posed in a preferred position, where the top surface faces upward. Other examples that involves the robotic manipulation may include, without being limited thereto, the type of grasping devices (i.e., suction cups, robot arms, gripper or electrical adhesive devices), the location to apply these devices on the object 100, the maximal speed and maximal force can be applied to the package, or the preferred ways to store, stack, unstack and box with the product.

In certain embodiments, it is possible that, instead of using the information of the location, orientation and the physical features of the object 100 to indicate the robotic manipulation for handling the object, the e-package information tags 200 may directly store the information of the robotic manipulation for handling the object.

Figure 4:
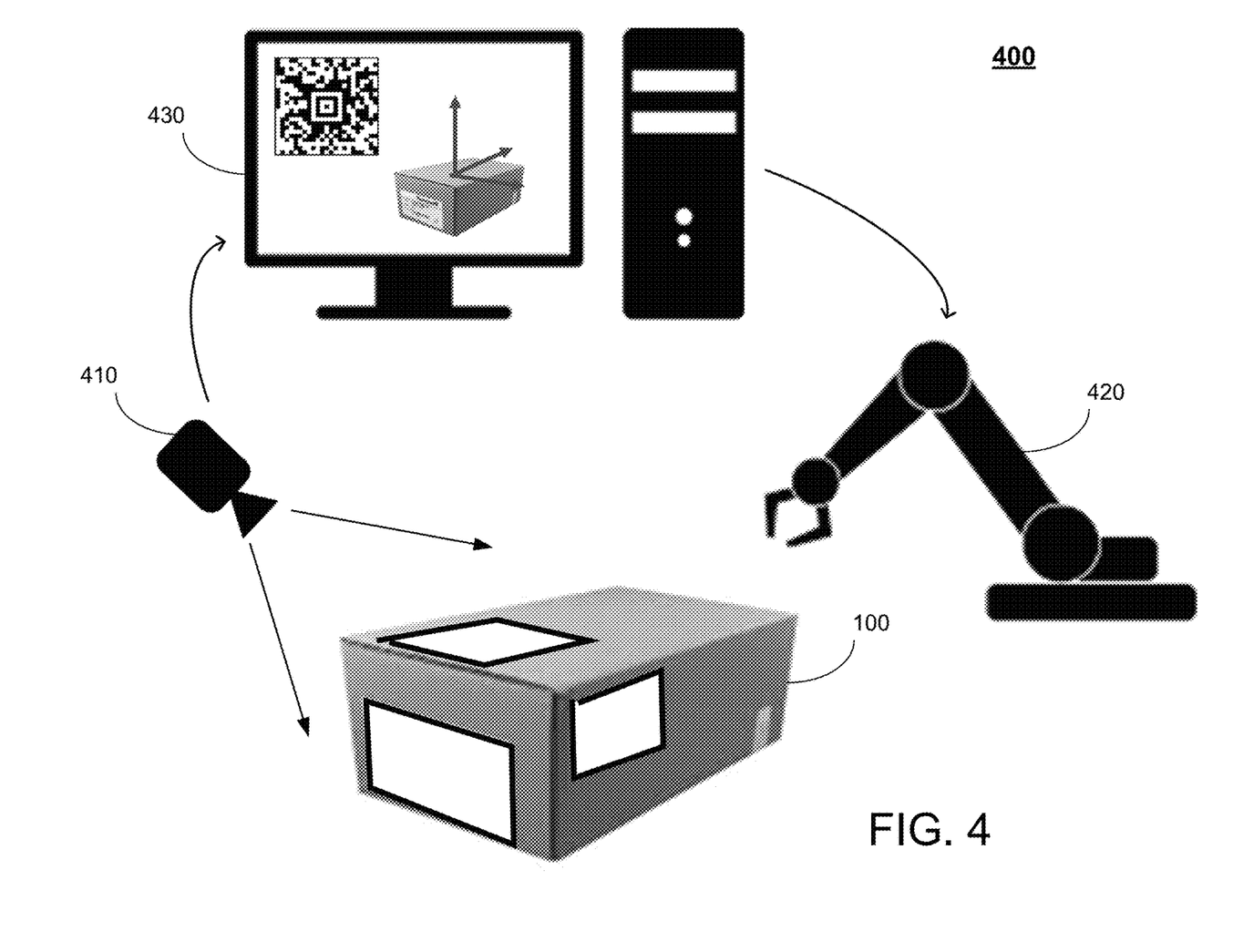
FIG. 4 is a schematic view of a robot system according to certain embodiments of the present invention.

In another aspect of the present invention, a robot system may be provided. For example, FIG. 4 is a schematic view of a robot system according to certain embodiments of the present invention. As shown in FIG. 4, the robot system 400 includes one or more sensing devices 410, one or more robotic grasping devices 420, and a controller 430, which may be used to process the object 100. Each of the sensing devices 410 may be a camera, which is used to obtain the information of the product. Each of the robotic grasping devices 420 may be a suction device, a robot arm, a gripper, an electrical adhesive device, or any other grasping devices capable of grasping the object to perform robotic manipulations for handling the object 100. The controller 430 is connected to the sensing devices 410 and the robotic grasping devices 420 in order to control the sensing devices 410 and the robotic grasping devices 420. The object 100 may be an object packaged as a product as shown in FIG. 1. In operation, the sensing devices 410 detects and captures the tag information, such as an image, of the object 100, and sends the captured tag information to the controller 430. The controller 430, based on the tag information, generate and sends an instruction to the robotic grasping devices 420. In response to the received instruction, the robotic grasping devices 420 perform certain operations to the object 100.

Figure 5:
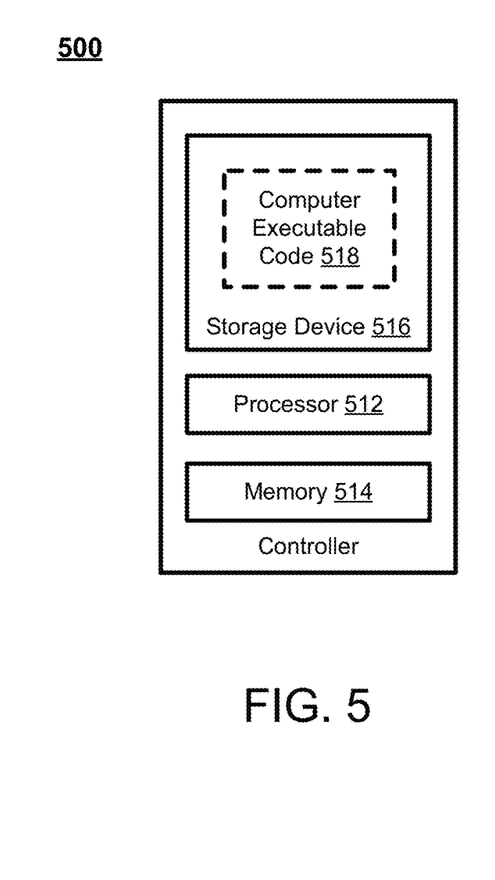
FIG. 5 is a schematic view of a controller of the robot system according to one embodiment of the present invention.

FIG. 5 is a schematic view of a controller of the robot system according to one embodiment of the present invention. As shown in FIG. 5, the controller 500 as shown in FIG. 5 may be a computing device, which includes a processor 512, a memory 514, and a storage device 516 storing computer executable code 518.

The processor 512 controls operation of the controller 510. In certain embodiments, the processor 512 may be a central processing unit (CPU). The memory 514 may be a volatile memory, such as the random-access memory (RAM), for storing the data and information during the operation of the controller 510. In certain embodiments, the memory 514 may be a volatile memory array. In certain embodiments, the controller 510 may run on more than one processor 512 and/or more than one memory 114.

The storage device 516 is a non-volatile data storage media or device for storing the computer executable code 518 of the controller 510. Examples of the storage device 516 may include flash memory, memory cards, USB drives, or other types of non-volatile storage devices such as hard drives, floppy disks, optical drives, or any other types of data storage devices. In certain embodiments, the controller 110 may have more than one storage device 116.

The computer executable code 518 include the code or instructions which, when executed at the processor 512, may perform certain features to control the operation of the sensing devices 410 and the robotic grasping devices 420 as shown in FIG. 4. Specifically, examples of these features may include, without being limited thereto, controlling one of the sensing devices 410 to detect and capture one of the e-package information tags on the object to obtain a captured image; processing the captured image to obtain the information of the product; and based on the information of the product, controlling one of the robotic grasping devices 420 to perform a robotic manipulation for handling the object 100.

Figure 6:
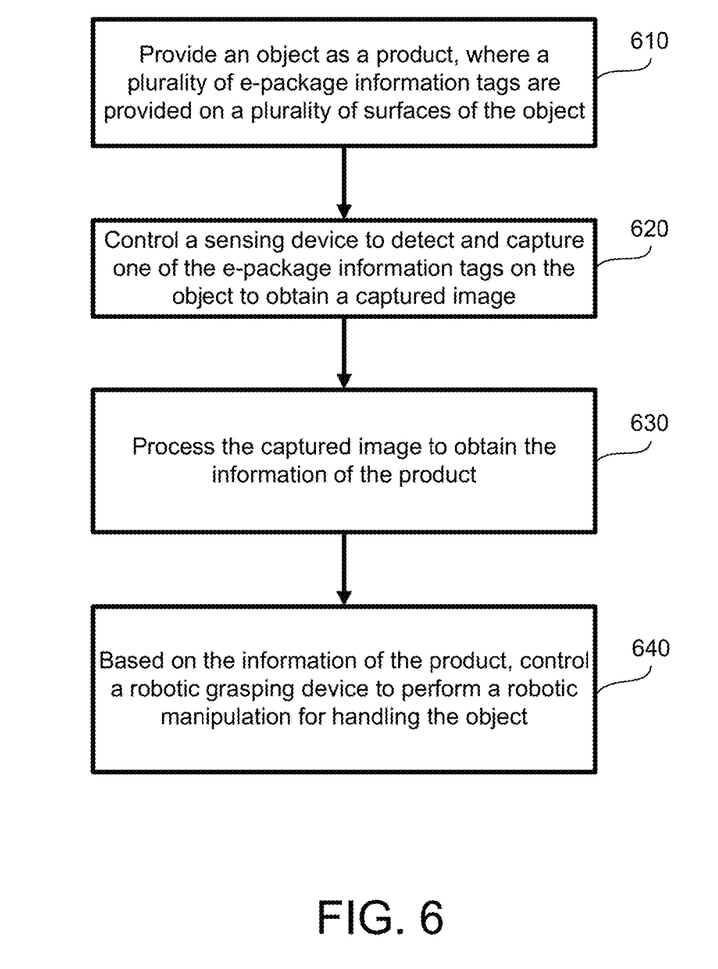
FIG. 6 is a flowchart showing a method of processing an object using a robot system according to one embodiment of the present invention.

In certain embodiments, the robot system 500 as shown in FIG. 5 may be used to perform the robotic manipulation for handling the object 100. For example, FIG. 6 is a flowchart showing a method of processing an object using a robot system according to one embodiment of the present invention. In certain embodiments, the method as shown in FIG. 6 may be implemented on a robot system as shown in FIG. 4 and FIG. 5. It should be particularly noted that, unless otherwise stated in the present invention, the steps of the method may be arranged in a different sequential order, and are thus not limited to the sequential order as shown in FIG. 6.

As shown in FIG. 6, when a robot system 400 as shown in FIG. 4 is provided, at procedure 610, an object 100 may be provided as a product, where a plurality of e-package information tags 200 may be provided on a plurality of surfaces of the object 100. Then, at procedure 620, the controller 430 may control a sensing device 410 to detect and capture one of the e-package information tags 200 on the object 100 in order to obtain a captured image. At procedure 630, the controller 430 may process the captured image to obtain the information of the product. In certain embodiments, the captured image may include more than one of the e-package information tags 200 on different surfaces of the object 100, such that the controller 430 may obtain the thorough information for the robotic manipulation for handling the object. Once the information of the product is obtained, at procedure 640, the controller 430 may control a robotic grasping device 420 to perform a robotic manipulation for handling the object 100 based on the information of the product. In certain embodiments, the sensing device 410 may also be configured to obtain the tilt angles of the labels and the distance variance from the sensing device 410 to different points on the labels, and process the information to determine the pose of the package. In certain embodiments, one or more of the e-package information tags 200 may include a first area and a second area. The first area is a predetermined area, and has special patterns, such that the first area is easily detected by the sensing device 410. In addition, the design of the first area also enables robust estimation of the pose of the first area or the e-package information tag 200. The first area usually has a simple pattern for being easily detected and fast pose estimation. In contrast, the second area may be more complex and includes detailed information of the object and the product.

In summary, using the robot system and the methods as described in certain embodiments of the present invention, packages can be mostly efficiently handled by robots in future logistic systems and it can reduce the cost and complexity of such robotic systems.

In certain embodiments, efficient fulfilment capabilities and low-cost logistic network are required for internet shopping. As a way to achieve this goal, robotic grasping is used to efficiently manipulate packages, such as robotic hands or suction cups. As an example, Delta Robot with suction cup can be used to grasp objects at picking work. A successful grasping can be ensured by applying the suction cup to the center of mass of the package when there is a large smooth enough surface on the package. However, the center of mass of a package with arbitrary products inside is difficult to calculate, especially using a computer vison system. Therefore, the geometric center of the package is often used instead of the true center of mass, and defining the shape of the package is important in order to find the geometric center. Under certain conditions, there is another possibility for the packages to be palletized in disorder during the process of transporting, which means the packages will not be well-posed horizontally. To better grasp the package in this kind of use case, it is required to obtain the information such the pose and the position of the package.

Figure 7:
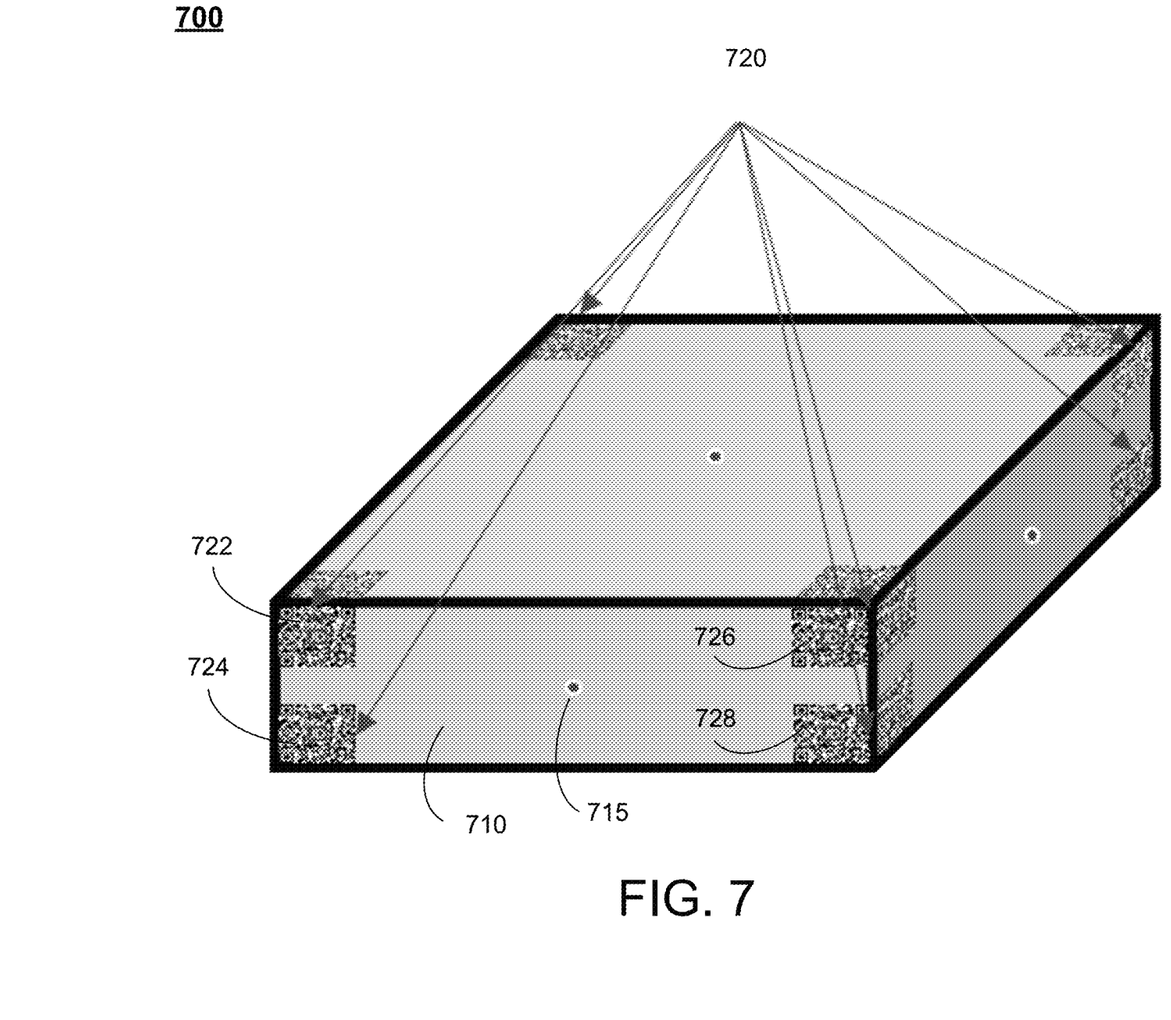
FIG. 7 is a schematic view of an object being packaged as a product using the packaging method according to one embodiment of the present invention.

In certain embodiments, a new packaging design is provided for easier edge detection, so as to accurately calculate the geometric center and better localize and position the packages in disorder. FIG. 7 is a schematic view of an object being packaged as a product using the packaging method according to another aspect of the present invention. As shown in FIG. 7, an object 700 is in a shape of a cuboid box, which has six surfaces 710. Each surface 710 has four e-package information tag 720 respectively located at the four corners of the corresponding surface 710. In the example shown in FIG. 7, the front surface of the object 700 has four e-package information tags 722, 724, 726 and 728 respectively located at the four corners of the front surface. In certain embodiments, each surface is further provided with a surface point 715. Each surface point 715 may be located at the geometric center of the corresponding surface, or located around the geometric center of the corresponding surface. In certain embodiments, the location of the surface point is special for each surface, to help determine the orientation and location of the object 700. In certain embodiments, the e-package information stages 720 are printed Apriltags or QR Codes.

In certain embodiments, for each surface 710, the four e-package information tags 720 are designed to four different orientation: Top-left Tag, Top-right Tag, Bottom-left Tag and Bottom-right Tag, with each tag corresponding to one of the four corners. Thus, if only one e-package information tag is detected, the computer vision system can know the exact pose (location, orientation, etc.) of the package no matter the pose of the package given it is not fully or mostly occluded.

Figure 8A:
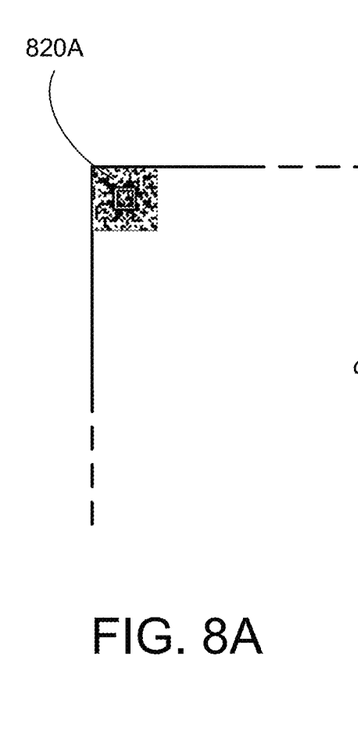
FIGS. 8A-8C are schematic views of locations of a tag according to certain embodiments of the present invention.
Figure 8B:
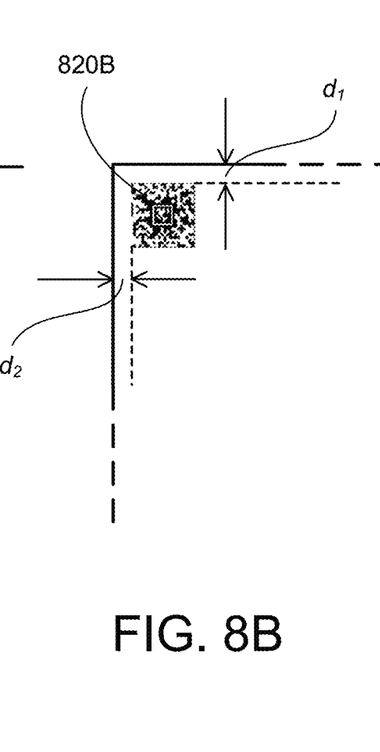
Figure 8C:
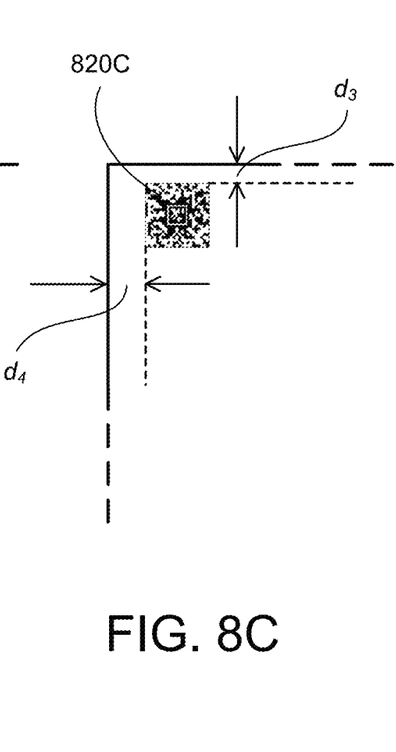

FIGS. 8A-8C schematically shows various location specifications of the tags at one corner of a surface of an object. As shown in FIG. 8A, the e-package information tag 820A is located at one corner of the corresponding surface, the two side lines of the tag is aligned and substantially overlap with the two edge lines of the corresponding corner. By this type of design, the edges of the surface can be easily and accurately defined by detecting of the tag 820A. In certain embodiments, as shown in FIG. 8B, the e-package information tag 820B is located at one corner of the corresponding surface, the two side lines of the tag is in parallel with the two edge lines of the corresponding corner. The distance $d_1$ between the top line of the tag 820B and the top edge line of the corner is basically the same as the distance $d_2$ between the left line of the tag 820B and the left edge line of the corner. By having a small distance between the tag and the edge, the tag 820B is prevented from being blocked due to small deformation of the corner. In certain embodiments, as shown in FIG. 8C, the e-package information tag 820C is located at one corner of the corresponding surface, the two side lines of the tag is in parallel with the two edge lines of the corresponding corner. The distance between the top line of the tag 820C and the top edge line of the corner is $d_3$, and the distance between the left line of the tag 820C and the left edge line of the corner is $d_4$. The distance $d_3$ and the distance $d_4$ is different from each other, such that the corner can be identified by a visual system simply by detecting the distance $d_3$ and the distance $d_4$. Actually, each of the tags on the object can have specific distances to two corresponding edge lines of the corresponding corner, such that each tag can be identified simply by their distances to the two edges. In addition, the distance information can also be combined with the information stored in the tag, so as to provide sufficient information for the operation of the product. In certain embodiments, the information has some redundancy so that a check of the validity of the information can be performed by the controller 430 shown in FIG. 4.

In certain embodiments, the Apriltags or QR Codes can carry both information needed by the fulfilment and information needed by logistic operations such as dimension, order ID, weight, weight distribution, product information, etc. of the package.

In certain embodiments, each tag can also contain the maximal speed, maximal force can be applied to the package, fragility, property, humidity, temperature, etc. to better ensure delivery quality.

In certain embodiments, the computer vision system can detect position and orientation of each printed tag and construct geometry shape of the package based on the position and orientation of the printed tag(s). For example, the geometry shape of the package is predetermined and stored in the product database. When the location and orientation of the tags relative to the package surfaces are detected, the location and orientation of the package are then determined based on the detected tags and the stored package geometry information. In one embodiment, April tags are printed on four corners of each side of a package. In another embodiment, April tags are only printed on the primary surface that suitable for manipulator to grasp or pick the package.

In certain embodiments, the computer vision system determines the edge of operable planes and the geometric center of each plane based on detected surface points 715 shown in FIG. 7. Each surface point 715 may be located at the geometric center of the corresponding surface, or located around the geometric center of the corresponding surface. In certain embodiments, the location of the geometric center is special for each surface, to help determine the orientation and location of the object 700.

In certain embodiments, the computer vision system can know the six degrees of freedom pose of the package by detecting all edges, to determine the overall shape and to know the accurate position of the package.

Figure 9A:
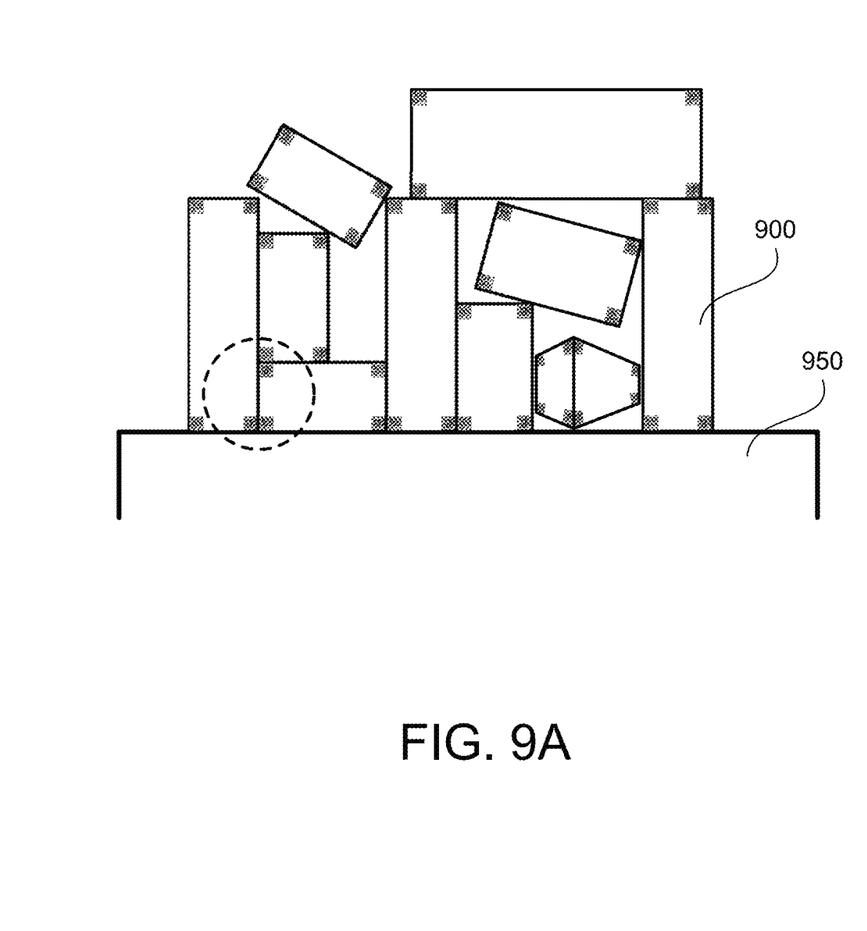
FIG. 9A is a schematic view of a pile of objects according to one embodiment of the present invention.
Figure 9B:
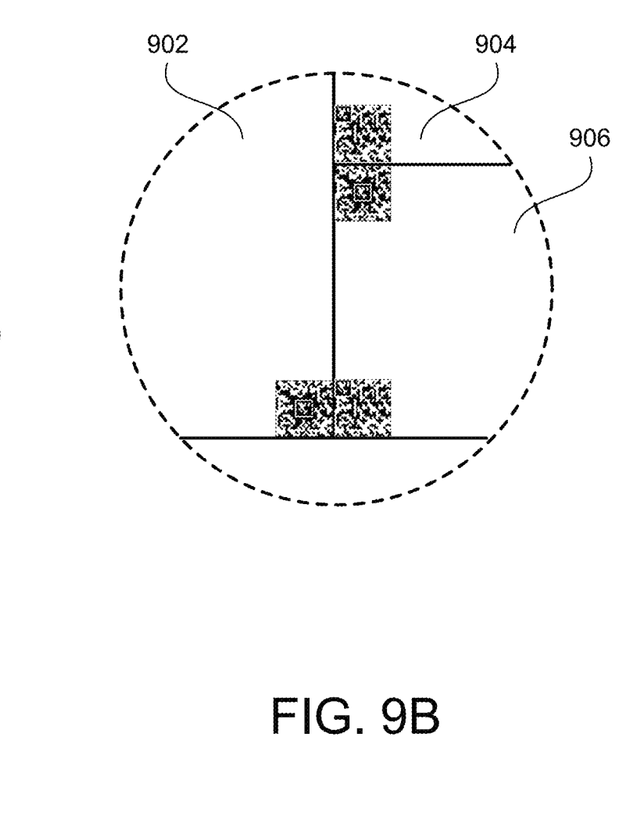
FIG. 9B is an enlarged view of a circled part of FIG. 9A.

According to certain embodiments of the present invention, the design is specifically useful in operating a large pile of packages as shown in FIG. 9A. FIG. 9A is a schematic view of a pile of objects according to one embodiment of the present invention. As shown in FIG. 9A, multiple packages 900 are packed on a surface of a platform 950. Some of the packages 900 is closely next to each other, and some of the packages may have a small distance to other packages. When two edges from two different packages 900 is touch to each other and aligned, it is difficult to determine those neighboring edges. With the aid of the tags at four corners according to certain embodiments of the present invention, those edges are easily differentiated from each other. For example, as shown in FIG. 9B, three objects 902, 904 and 906 has edges aligned with each other. By determining the corresponding tags located at the corners, the size and location of the tags, and the information stored in the tags, the neighboring edges of those objects 902, 904 and 906 can be identified and differentiated. The defined edge information of can then be used for suitable manipulation of those objects.

In summary, packages can be mostly localized, positioned and guaranteed for a more efficient manipulation by using this new packaging design to detect all edges more easily, and it can also reduce the cost of such complex robotic systems.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A packaging method, comprising:
   providing an object as a product to be packaged; and
   providing a plurality of e-package information tags on a plurality of surfaces of the object for storing information of the product,
   wherein each of the surfaces is provided with at least one of the plurality of e-package information tags thereon, and
   the information of the product comprises information of a location, an orientation and physical features of the object,
   wherein each of the plurality of e-package information tags is in a form of a 2-dimensional code having a first area and a second area, the first area of each of the plurality of e-package information tags is designed to detect and estimate pose of the object; and
   wherein the pose of the object is estimated by obtaining tilt angles of the plurality of e-package information tags and distance variance from a sensing device to different points on the plurality of e-package information tags and processing the tilt angles and the distance variance by the sensing device.

2. The packaging method of claim 1, wherein the at least one of the plurality of e-package information tags provided on each of the surfaces is provided at a different relative location thereon, and with a different size, or a different shape.

3. The packaging method of claim 1, wherein the second area of each of the plurality of e-package information tags stores the information of the physical features of the object, wherein the physical features of the object comprises:
   a dimension of the object;
   a weight of the object;
   a weight distribution of the object;
   a property of the object;
   product information of the object; and
   the location and the orientation of the object.

4. The packaging method of claim 1, wherein each of the plurality of e-package information tags is in a form of a tag, a 1-dimensional barcode, or a watermark tag.

5. The packaging method of claim 1, wherein each of the plurality of e-package information tags stores information of robotic manipulation for handling the object.

6. A robot system for processing the object provided in claim 1, comprising:
   a plurality of robotic grasping devices, each being configured to grasp the object;
   a plurality of sensing devices, each being configured to obtain the information of the product; and
   a controller configured to control the robotic grasping devices and the sensing devices,
   wherein the controller is configured to perform:
      controlling one of the sensing devices to detect and capture one of the plurality of e-package information tags on the object to obtain a captured image;
      processing the captured image to obtain the tilt angles of the plurality of e-package information tags and distance variance from the one of the plurality of sensing devices to different points on the plurality of e-package information tags;
      processing the tilt angles and the distance variance to determine the pose of the object; and
      based on the pose of the object, controlling one of the robotic grasping devices to perform a robotic manipulation for handling the object.

7. The robot system of claim 6, wherein each of the sensing devices is a camera, and each of the robotic grasping devices is a suction device, a robot arm, a gripper, or an electrical adhesive device.

8. A method of processing an object using a robot system, comprising:
   providing the object as a product, wherein a plurality of e-package information tags is provided on a plurality of surfaces of the object for storing information of the product, each of the surfaces is provided with at least one of the plurality of e-package information tags thereon, and the information of the product comprises information of a location, an orientation and physical features of the object;
   controlling a sensing device of the robot system to detect and capture one of the plurality of e-package information tags on the object to obtain a captured image;
   processing the captured image to obtain tilt angles of the plurality of e-package information tags and distance variance from the sensing devices to different points on the plurality of e-package information tags;
   processing the tilt angles and the distance variance to determine pose of the object; and
   based on the pose of the object, controlling a robotic grasping device of the robot system to perform a robotic manipulation for handling the object.

9. The method of claim 8, wherein the sensing device is a camera, and the robotic grasping device is a suction device, a robot arm, a gripper, or an electrical adhesive device.

10. The method of claim 8, wherein the one of the plurality of e-package information tags provided on each of the surfaces is provided at a different relative location thereon, with a different size, or with a different shape.

11. The method of claim 8, wherein each of the plurality of e-package information tags is in a form of a 2-dimensional code having a first area and a second area.

12. The method of claim 11, wherein the first area of each of the plurality of e-package information tags is designed for easy detection and robust pose estimation, and the second area of each of the plurality of e-package information tags stores the information of the physical features of the object, wherein the physical features of the object comprises:
   a dimension of the object;
   a weight of the object;
   a weight distribution of the object;

a property of the object;
product information of the object; and
the location and the orientation of the object.

13. The method of claim 8, wherein each of the plurality of e-package information tags is in a form of a tag, a 1-dimensional barcode, or a watermark tag.

14. The method of claim 8, wherein each of the plurality of e-package information tags stores information of the robotic manipulation for handling the object.

15. A packaging method, comprising:
providing an object as a product to be packaged; and
providing a plurality of e-package information tags on a plurality of surfaces of the object for storing information of the product, one e-package information tag being provided on each corner of each of the plurality of surfaces,
wherein the information of the product comprises information of a location, an orientation and physical features of the object;
wherein each of the plurality of e-package information tags is in a form of a 2-dimensional code having a first area and a second area, the first area of each of the plurality of e-package information tags is designed to detect and estimate pose of the object: and
wherein the pose of the object is estimated by obtaining tilt angles of the plurality of e-package information tags and distance variance from a sensing device to different points on the plurality of e-package information tags and processing the tilt angles and the distance variance by the sensing device.

16. The packaging method of claim 15, wherein the e-package information tag comprises Apriltags or QR codes, and the e-package information tag comprises dimension, order ID, weight, weight distribution, and product information of the object.

17. The packaging method of claim 15, wherein the e-package information tag comprises maximal speed, maximal force can be applied, fragility, property, humidity, and temperature of the object.

18. The packaging method of claim 15, wherein each surface of the object that is operable by a robot is further provided with a surface point for determination of the surface as an operable surface and determination of a geometric center of the object.

19. A robot system for processing the object provided in claim 15, comprising:
a plurality of robotic grasping devices, each being configured to grasp the object;
a plurality of sensing devices, each being configured to obtain the information of the product; and
a controller configured to control the robotic grasping devices and the sensing devices,
wherein the controller is configured to perform:
controlling one of the sensing devices to detect and capture one of the plurality of e-package information tags on the object to obtain a captured image and to detect location of the plurality of e-package information tags;
processing the captured image to obtain tilt angles of the plurality of e-package information tags and distance variance from the one of the plurality of sensing devices to different points on the plurality of e-package information tags;
processing the tilt angles and the distance variance to determine pose of the object; and
based on the pose of the object and the location of the plurality of e-package information tags, controlling one of the robotic grasping devices to perform a robotic manipulation for handling the object.

20. The robot system of claim 19, wherein each of the sensing devices is a camera, and each of the robotic grasping devices is a suction device, a robot arm, a gripper, or an electrical adhesive device.

* * * * *